(12) United States Patent
Popp et al.

(10) Patent No.: US 7,630,522 B2
(45) Date of Patent: Dec. 8, 2009

(54) BIOMETRIC MEASUREMENT USING INTERACTIVE DISPLAY SYSTEMS

(75) Inventors: Bogdan Popp, Sammamish, WA (US); Robert A. Brigham, II, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 728 days.

(21) Appl. No.: 11/370,558

(22) Filed: Mar. 8, 2006

(65) Prior Publication Data

US 2007/0211921 A1    Sep. 13, 2007

(51) Int. Cl.
 *G06K 9/00* (2006.01)
(52) U.S. Cl. ...................................... 382/115
(58) Field of Classification Search ........................ None
 See application file for complete search history.

(56) References Cited

U.S. PATENT DOCUMENTS

| | | | | |
|---|---|---|---|---|
| 5,099,131 | A * | 3/1992 | Brownrigg et al. | 250/458.1 |
| 5,509,083 | A * | 4/1996 | Abtahi et al. | 382/124 |
| 5,850,222 | A * | 12/1998 | Cone | 345/418 |
| 6,327,376 | B1 * | 12/2001 | Harkin | 382/124 |
| 6,546,121 | B1 * | 4/2003 | Oda | 382/117 |
| 6,546,309 | B1 | 4/2003 | Gazzuolo | 700/132 |
| 6,615,264 | B1 | 9/2003 | Stoltz et al. | 709/227 |
| 7,359,533 | B2 * | 4/2008 | Moon et al. | 382/124 |
| 2001/0031073 | A1 * | 10/2001 | Tajima | 382/118 |
| 2002/0133432 | A1 | 9/2002 | Yamashita | 705/27 |
| 2003/0101105 | A1 * | 5/2003 | Vock | 705/27 |
| 2004/0049309 | A1 | 3/2004 | Gardner et al. | 700/132 |
| 2004/0093349 | A1 * | 5/2004 | Buinevicius et al. | 707/104.1 |
| 2004/0208343 | A1 | 10/2004 | Golden et al. | 382/110 |
| 2005/0185847 | A1 | 8/2005 | Rowe | 382/224 |
| 2005/0265586 | A1 | 12/2005 | Rowe et al. | 382/124 |

FOREIGN PATENT DOCUMENTS

WO    WO2005/076813 A2    8/2005

OTHER PUBLICATIONS

My Virtual Model, Inc. Copyright 2001-2005. 4pgs, printed. <http://www.myvirtualmodel.com/en/about_us.htm>.
VisImage Systems Inc. "BoSS-21: Body Measurement and Garment Sizing." Copyright 1996-2003. 3 pgs, printed. <http://ww.vis.ca/bossprinciple.htm>.

* cited by examiner

*Primary Examiner*—Bhavesh M Mehta
*Assistant Examiner*—Alex Liew
(74) *Attorney, Agent, or Firm*—Workman Nydegger (57) ABSTRACT

Biometric data are produced in response to user input to an interactive display. The user input occurs when the interactive display senses a user input proximate to an interactive display surface that is able to respond to simultaneous multiple inputs. A detection signal based on a user input is processed to identify biometric indicia associated with the user input. User input can be by any biometric entity, such as an animal—not just by a human. Based on the biometric indicia identified, user biometric data are produced. The user biometric data includes parameters describing physical characteristics associated with the portion of the user that provided the user input. The biometric data can be compared to stored biometric data associated with a specific user and/or user profile, e.g., to enable access by the user to an account, and can also be employed to provide other functions, such sizing information, to applications.

23 Claims, 6 Drawing Sheets

BIOMETRIC MEASUREMENT USING INTERACTIVE DISPLAY SYSTEMS

BACKGROUND

The utility and enjoyment of computer systems can be enhanced by providing better user interfaces. User interfaces for computers systems have evolved significantly since the personal computer (PC) first became widely available. Early PCs were limited to user input devices, such as the keyboard and serial mouse, and were primarily text-based. However, a vast improvement in the speed and the power of microprocessors, greater availability of low-cost memory, and improved programming functionality have all contributed to the creation of much more sophisticated user interface designs and hardware, and the development of much more user-friendly graphic operating systems.

One particular area of advancement in user interface technology pertains to the recent development of an interactive display, to which a number of commonly assigned patent applications have been directed. An interactive display presents graphic images to a user on a flat surface, such as the top of a table or other housing format. In addition, this surface is responsive to input by a user. A PC is coupled to the interactive display to provide the processing power that yields a rich user interactive experience, offering more sophisticated command and interface features, and a far more natural interactive approach in providing input to the system, particularly as related to displayed images.

Interactive display systems that have been developed typically employ specialized optical systems adapted for projecting images and for detecting user input. An optical user input detection system can be based on illuminating a surface of the interactive display with infrared light, which is invisible to a user and does not interfere with the display of images by a projection system or other form of display device. With these types of detection systems, any objects that are located on or near the surface of the display will reflect the infrared light back to the detection system, where it can be detected as user input.

Interactive displays are thus being developed with the capability to process the signals produced in response to the non-visible light reflections from an object placed on or near the display surface, to determine the size, geometry, and even the trajectory of the object. This functionality of an interactive display provides a technological platform for developing completely new applications that were not possible with prior generations of conventional user interfaces. For example, this form of interactive display lends itself to simultaneous use by multiple users positioned around the interactive display surface. However, tracking multiple users of an interactive display system presents a challenge, particularly if the users are allowed to simultaneously access different individual user accounts or profiles that are associated with use of the interactive display system.

This new type of interactive display provides an opportunity for users to more efficiently conduct online commerce, since a user can readily interact with and navigate within programs and websites using gestures and by moving objects around on the display surface. However, in addition to simply selecting input options, an interactive display can assist in completing transactions in other ways. Frequently, consumers shopping online for clothing are required to select a size for an item in order to complete a transaction. For example, shoes, pants, shirts, jackets, and gloves are all items that are available in different sizes. However, users may not recall the correct size for an item such as a glove. It would be desirable to employ the imaging capability of an interactive display to directly determine the size of user's hand, thereby enabling the correct size of glove to be determined. Also, user profiles can be associated with biometric data such as hand sizes, so that the sizing of other articles of clothing stored in association with the profile of each user of an interactive display can readily be recalled from memory to complete a size selection during an online transaction. Therefore, interest currently exists in employing interactive displays and developing appropriate software for biometric measurements that can be employed to facilitate user identification and provide other functionality.

SUMMARY

The description below includes a discussion of a method that can be implemented using a computer for producing user biometric data based on user input to an interactive display. The interactive display is able to simultaneously detect inputs at a plurality of locations proximate to the surface of the interactive display that is employed both for displaying images and detecting a user input. As discussed in more detail below, the method includes first receiving a user input based on detecting the user input from a portion of a user, e.g., from a user's hand. However, the user input can be from other types of biological entities, such as an animal like a dog or cat, and is not limited just to being provided by a human. A detection signal produced in response to the user input can be processed to identify biometric indicia associated with the user input. Based on the biometric indicia identified, user biometric data can be produced. The user biometric data can include parameters describing one or more physical characteristics associated with the portion of the user that was sensed, or can be employed to simply identify the user from among a group of users of the interactive display.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

DESCRIPTION

Figures and Disclosed Embodiments are Not Limiting

Exemplary embodiments are illustrated in referenced Figures of the drawings. It is intended that the embodiments and Figures disclosed herein are to be considered illustrative rather than restrictive. Furthermore, in the claims that follow, when a list of alternatives uses the conjunctive "and" following the phrase "at least one of" or following the phrase "one of," the intended meaning of "and" corresponds to the conjunctive "or."

Exemplary Computing System

Figure 1:
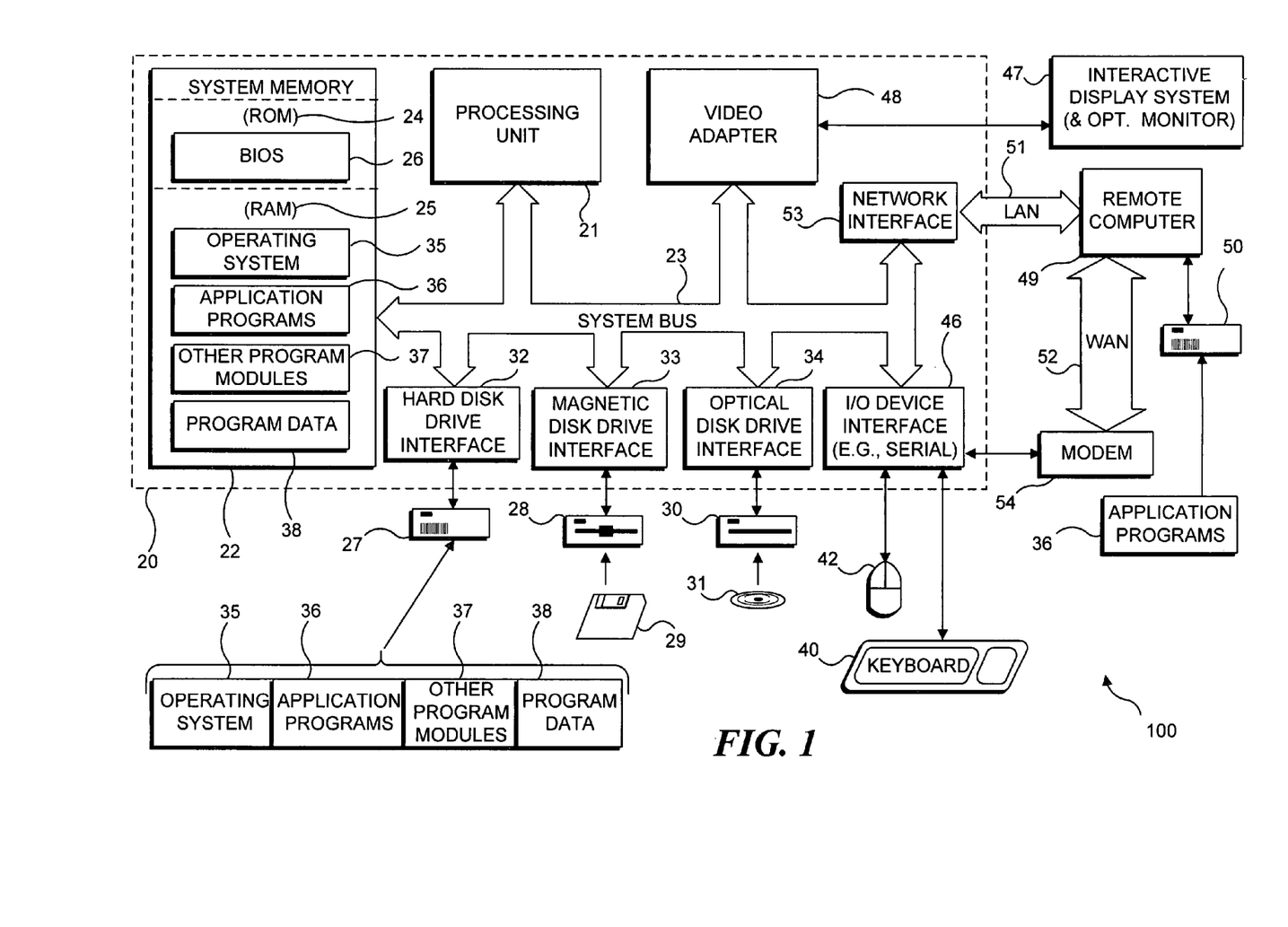
FIG. 1 is a functional block diagram of a generally conventional computing device or PC that is suitable for use with an interactive display, in practicing the present approach.

FIG. 1 is a functional block diagram 100 of an exemplary computing system and/or computer server for serving digital media to the computing device of connected clients, such as an interactive display table or a similar computing system.

The following discussion is intended to provide a brief, general description of a suitable computing environment in which certain methods may be implemented. Further, the following discussion illustrates a context for implementing computer-executable instructions, such as program modules, with a computing system. Generally, program modules include routines, programs, objects, components, data structures, etc., that perform particular tasks or implement particular abstract data types. The skilled practitioner will recognize that other computing system configurations may be applied, including multiprocessor systems, mainframe computers, personal computers, processor-controlled consumer electronics, personal digital assistants (PDAs) (but likely not when used as a server of digital media content), and the like. One implementation includes distributed computing environments where tasks are performed by remote processing devices that are linked through a communications network. In a distributed computing environment, program modules may be located in both local and remote memory storage devices.

With reference to FIG. 1, an exemplary system suitable for implementing various methods is depicted. The system includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25.

A basic input/output system 26 (BIOS), which contains the fundamental routines that enable transfer of information between elements within the PC 20, such as during system start up, is stored in ROM 24. PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the described exemplary environment employs a hard disk 27, removable magnetic disk 29, and removable optical disk 31, those skilled in the art will recognize that other types of computer readable media, which can store data and machine instructions that are accessible by a computer, such as magnetic cassettes, flash memory cards, digital video disks (DVDs), Bernoulli cartridges, RAMs, ROMs, and the like, may also be used.

A number of program modules may be stored on the hard disk 27, magnetic disk 29, optical disk 31, ROM 24, or RAM 25, including an operating system 35, one or more application programs 36, other program modules 37, and program data 38. In one implementation, programs 36 can include object recognition software that is suitable for use with the optical system of an interactive display. In another implementation, program modules 37 can include various program modules for determining biometric parameters and for applying biometric data for use with applications. A user may enter commands and information in PC 20 and provide control input through input devices, such as a keyboard 40 and a pointing device 42. Pointing device 42 may include a mouse, stylus, wireless remote control, or other pointer, but in connection with the presently described embodiments, such conventional pointing devices may be omitted, since the user can employ an interactive display system for input and control. As used in the following description, the term "mouse" is intended to encompass any pointing device that is useful for controlling the position of a cursor on the screen. Other input devices (not shown) may include a microphone, joystick, haptic joystick, yoke, foot pedals, game pad, satellite dish, scanner, or the like. Also, PC 20 may include a Bluetooth radio or other wireless interface for communication with other interface devices, such as printers, or the interactive display table described in detail below. These and other input/output (I/O) devices can be connected to processing unit 21 through an I/O interface 46 that is coupled to system bus 23. The phrase "I/O interface" is intended to encompass each interface specifically used for a serial port, a parallel port, a game port, a keyboard port, and/or a universal serial bus (USB). System bus 23 can also be connected to a camera interface (not shown), which is coupled to an interactive display 60 in order to receive signals from a digital video camera that is included within interactive display 60, as discussed in greater detail below. The digital video camera may be instead coupled to an appropriate serial I/O port, such as to a USB port. System bus 23 can also be connected through I/O interface 46 or another interface, to a light source within an interactive display in order to provide control signals to the light source, as discussed in greater detail below. Furthermore, system bus 23 can also be connected through I/O interface 46 or another interface to a light detector within an interactive display in order to receive user input. Optionally, a monitor 47 can be connected to system bus 23 via an appropriate interface, such as a video adapter 48; however, the interactive display system described below can provide a much richer display and also interact with the user for input of information and control of software applications and is therefore preferably coupled to the video adaptor. In general, PCs can also be coupled to other peripheral output devices (not shown), such as speakers (through a sound card or other audio interface—not shown) and printers.

Certain methods described in detail below, can be practiced on a single machine, although PC 20 can also operate in a networked environment using logical connections to one or more remote computers, such as a remote computer 49.

Remote computer 49 can be another PC, a server (which can be configured much like PC 20), a router, a network PC, a peer device, or a satellite or other common network node, (all not shown) and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise-wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, such as the Internet. Modem 54, which may be internal or external, is connected to the system bus 23 or coupled to the bus via I/O device interface 46, i.e., through a serial port. In a networked environment, program modules, or portions thereof, used by PC 20 may be stored in the remote memory storage device. It will be appreciated that the network connections shown are exemplary and other means of establishing a communications link between the computers may be used, such as wireless communication and wide band network links.

Exemplary Interactive Display

Figure 2:
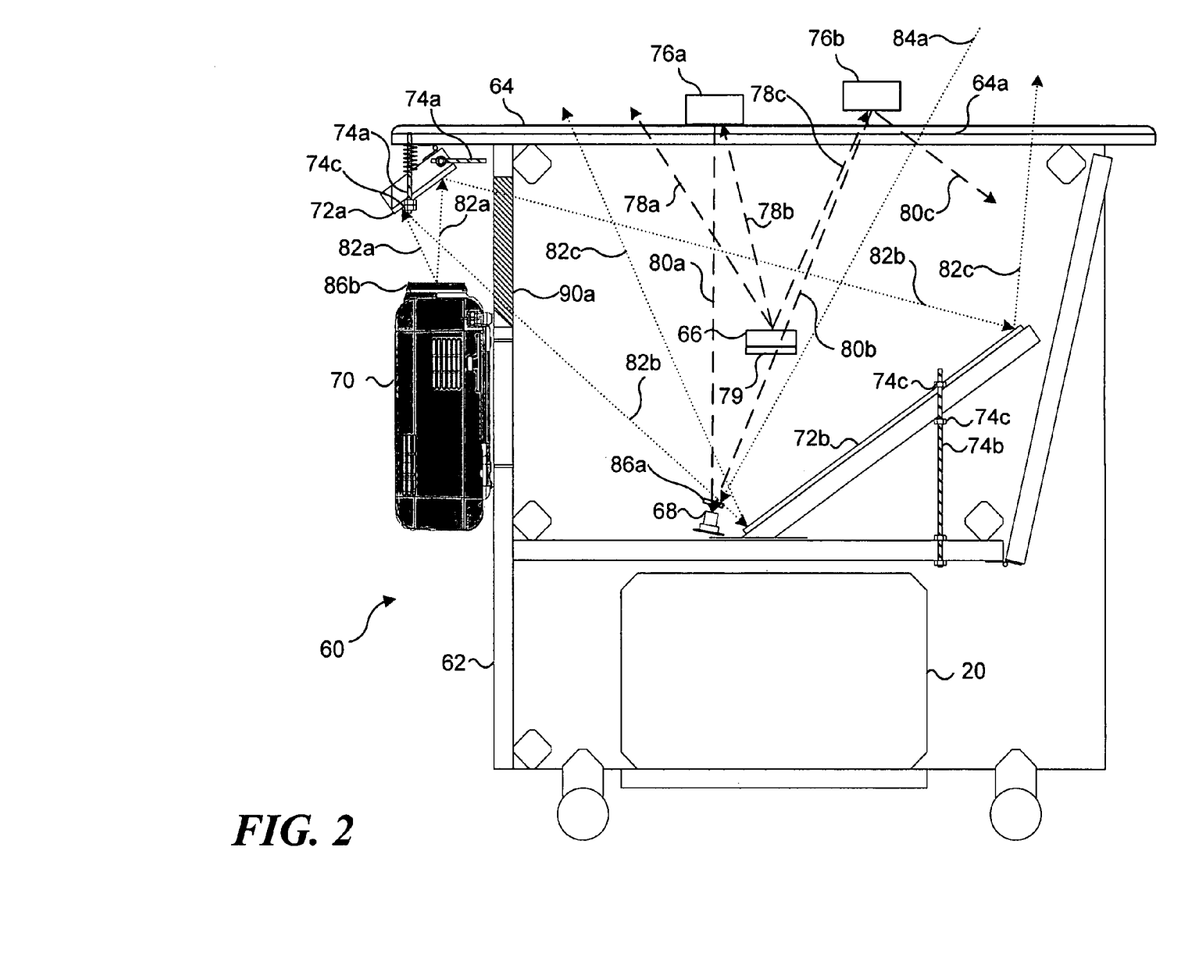
FIG. 2 is a cross-sectional view illustrating internal components of an interactive display system, in the form of an interactive display table that includes an integral PC.

In FIG. 2, an exemplary interactive display table 60 is shown that includes PC 20 within a frame 62 and which serves as both an optical input and video display device for the computer. The depicted embodiment is a cut-away figure of one implementation of interactive display table 60. In the embodiment shown in FIG. 2, rays of light 82a-82c used for displaying text and graphic images are illustrated using dotted lines, while rays of infrared (IR) light used for sensing objects on or just above an interactive display surface 64 of interactive display table 60 are illustrated using dashed lines. The perimeter of the table surface is useful for supporting a user's arms or other objects, including objects that may be used to interact with the graphic images or virtual environment being displayed on interactive display surface 64.

A light source 66 can comprise any of a variety of light emitting devices, such as a light emitting diode (LED), laser diode, and other suitable light sources. In some implementations, light source 66 can be a light source that can be driven to scan in two orthogonal dimensions, i.e., in the X and Y directions. In this implementation, the scanning mechanism used for light source 66 can be a rotating mirror, a galvanometer mirror, or other well known scanning mechanisms commonly used for producing a raster scan of a surface with a light beam. In general, light source 66 is configured for emitting light having a wavelength in the infrared (IR) spectrum, which is therefore not visible to the human eye. However, any wavelength of light can be used that is invisible to the human eye, so as to avoid interfering with the display of visible images provided on interactive display surface 64. Light source 66 can be mounted in any position on the interior side of frame 62, depending on the particular light source used. The light that is produced by light source 66 is directed upwardly toward the underside of interactive display surface 64, as indicated by dashed lines 78a, 78b, and 78c. Light emitted from light source 66 is reflected from any objects that are on or adjacent to interactive display surface 64 after passing through a translucent layer 64a of the table, comprising a sheet of vellum or other suitable translucent material with light diffusing properties.

As used in the description and claims that follow, the term "proximate to" is used with the intent that this phrase encompass both an object that is either touching the interactive display surface or is separated from the interactive display surface by short distance, e.g., by up to 3 centimeters or more, depending on factors such as the reflectivity of the object. Although only one light source 66 is shown, it will be appreciated that a plurality of such light sources may be mounted at spaced-apart locations around the interior sides of frame 62 to provide an even illumination of the interactive display surface. The light produced by light source 66 may either exit through the table surface without illuminating any objects, as indicated by dash line 78a; illuminate objects on the table surface, as indicated by dash line 78b; and/or illuminate objects a short distance above (i.e., proximate to) the interactive display surface but not touching it, as indicated by dash line 78c. Also, although the discussion herein refers to "infrared light" being used for detecting a portion of a user, it should be understood that any other non-visible light can be used for this purpose, such as ultraviolet light, and it is considered that such other non-visible light is encompassed within the scope of the claims included herein. Further, it is contemplated that the present approach can be used in connection with other methods for detecting an object that is positioned proximate the interactive display surface. For example, a capacitive sensor might be used to detect a portion of a user placed proximate to the interactive display surface.

In the example shown in this exemplary embodiment, objects above interactive display surface 64 include a "touch" object 76a that rests "on" or at least partially touches the display surface, and a "hover" object 76b that is close to, but not in actual contact with the interactive display surface. Thus, both touch and hover objects can be "adjacent to" the display surface, as that term is used in the following description. As a result of using translucent layer 64a under the interactive display surface to diffuse light passing through the interactive display surface, as an object approaches the top of interactive display surface 64, the amount of IR light that is reflected by the object increases to a maximum level when the object is actually in contact with the display surface.

As illustrated in FIG. 2, a light detector 68 is mounted to frame 62 below interactive display surface 64, in a position appropriate to detect IR light that is reflected from a "touch" object or "hover" object disposed above (i.e., adjacent to) the interactive display surface. In general, light detector 68 can be any light detection device suitable for detecting light reflected from objects on or adjacent to interactive display surface 64. For example, light detector 68 can be an area CMOS or area charged coupled device (CCD) sensor, or a digital video camera. While the implementation shown in FIG. 2 depicts one light detector 68, a plurality of light detectors 68 can be employed within interactive display 60. Light detector 68 can be equipped with an IR pass filter 86a that transmits only IR light and blocks ambient visible light traveling through interactive display surface 64 along dotted line 84a. In this implementation, a baffle 79 is disposed between light source 66 and the light detector 68 to prevent IR light that is directly emitted from light source 66 from entering light detector 68, since it is preferable that light detector 68 produce an output signal that is only responsive to IR light reflected from objects that are proximate to interactive display surface 64. It will be apparent that light detector 68 will also respond to any IR light included in the ambient light that passes through interactive display surface 64 from above and into the interior of the interactive display, including ambient IR light that also travels along the path indicated by dotted line 84a.

IR light reflected from objects on or above the table surface may be: (a) reflected back through translucent layer 64a, through IR pass filter 86a and into light detector 68, as indicated by dash lines 80a and 80b; or, (b) reflected or absorbed by other interior surfaces within the interactive display 60 without entering light detector 68, as indicated by dash line 80c.

Translucent layer 64a diffuses both incident and reflected IR light. Thus, as explained above, "hover" objects such as hover object 76b that are closer to interactive display surface 64 will reflect more IR light back to light detector 68 than objects of the same reflectivity that are farther away from the display surface. Light detector 68 senses the IR light reflected from "touch" and "hover" objects within its operating field and produces a detection signal corresponding to the reflected IR light that it receives. This detection signal is input to the PC 20 for processing to determine a location of each such object, and optionally, other parameters, such as the size, orientation, shape, and trajectory of the object. It should be noted that a portion of an object, such as a user's forearm, may be above the table while another portion, such as the user's hand or finger, can be in contact with the display surface. In some implementation, the interactive display includes software modules for recognizing portions of a user and generating biometric data related to the detected portion of the user. In addition, other parameters associated with an object may be detected. For example, an object may include an IR light reflective pattern or coded identifier, such as a bar code, on its bottom surface that is specific to that object or to a class of related objects of which that object is a member. Accordingly, the detection signal from one or more light detectors 68 can also be used for detecting each such specific object, as well as determining other parameters of the object or associated with the object, in response to the IR light reflected from the object and/or from a reflective pattern.

Embodiments are thus operable to recognize an object and/or its position relative to the interactive display surface 64, as well as other information, by detecting its identifying characteristics using the reflected IR light from the object. Details of the logical steps implemented to thus detect and identify an object, its orientation, and other parameters are explained in the commonly-assigned patent applications, including application Ser. No. 10/814,577 entitled "Identification Of Object On Interactive Display Surface By Identifying Coded Pattern," and application Ser. No. 10/814,761 entitled "Determining Connectedness And Offset Of 3D Objects Relative To An Interactive Surface," both of which were filed on Mar. 31, 2004. The disclosure and drawings of these two patent applications are hereby specifically incorporated herein by reference as background information.

Figure 3:
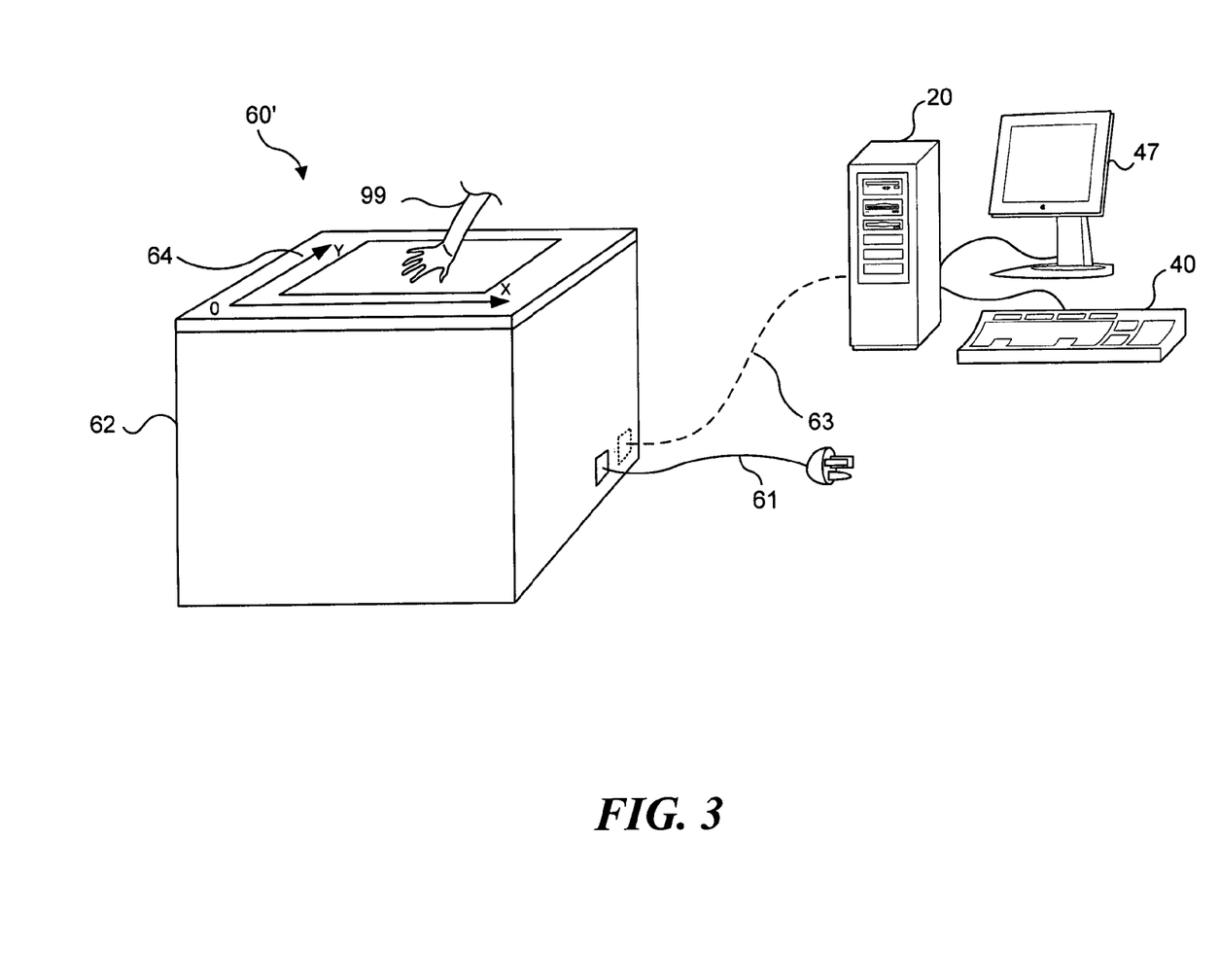
FIG. 3 is an isometric view of an embodiment of an interactive display system in which the interactive display table is connected to an external PC.

PC 20 may be integral to interactive display table 60, as shown in the embodiment of FIG. 2, or alternatively, may instead be external to the interactive display table, as shown in the embodiment of FIG. 3. In FIG. 3, an interactive display table 60' is connected through a data cable 63 to an external PC 20 (which includes optional monitor 47, as mentioned above). Alternatively, external PC 20 can be connected to interactive display table 60' via a wireless link (i.e., WiFi or other appropriate radio signal link). As also shown in this Figure, a set of orthogonal X and Y axes are associated with interactive display surface 64, as well as an origin indicated by "0." While not discretely shown, it will be appreciated that a plurality of coordinate locations along each orthogonal axis can be employed to specify any location on interactive display surface 64. Also illustrated in the Figure is a user appendage 99, which is depicted to illustrate that a user can provide input to table 60' by directly placing a hand on the surface of the table within the interface region defined by the illustrated coordinate system. In other embodiments, table 60' can be configured for use with other parts of a user including feet, fingers and portion of a face. In each of the described implementations, display 60' can be configured for control by a user manipulating objects proximate to the display surface. In an example (not shown), table 60' can be configured as a kiosk placed close to a floor that can be employed by user to determine a shoe size by placing a foot onto the display surface. In another example, table 60' can be configured to assist a user with selecting a glove size or even assist with the sizing of eyeglasses, in addition to facilitating a purchase through a web-enabled product ordering system.

If an interactive display table 60' is connected to an external PC 20 (as in FIG. 3) or to some other type of external computing device, such as a set top box, video game, laptop computer, or media computer (not shown), then interactive display table 60' comprises an input/output device. Power for interactive display table 60' is provided through a power lead 61, which is coupled to a conventional alternating current (AC) source (not shown). Data cable 63, which connects to interactive display table 60', can be coupled to a USB 2.0 port, an Institute of Electrical and Electronics Engineers (IEEE) 1394 (or Firewire) port, or an Ethernet port on PC 20. It is also contemplated that as the speed of wireless connections continues to improve, interactive display table 60' might also be connected to a computing device, such as PC 20 via such a high speed wireless connection, or via some other appropriate wired or wireless data communication link. Whether included internally as an integral part of the interactive display system, or externally, PC 20 executes algorithms for processing the digital images, from light detector 68 (configured as a digital video camera) and executes software applications that are designed to employ the more intuitive user interface functionality of interactive display table to good advantage, as well as executing other software applications that are not specifically designed to make use of such functionality, but can still make good use of the input and output capability of the interactive display table. As yet a further alternative, the interactive display system can be coupled to an external computing device, but include an internal computing device for doing image processing and other tasks that would then not be done by the external PC.

An important and powerful feature of interactive display table 60 or 60' (i.e., of either of the embodiments of the interactive display table discussed above) is its ability to display graphic images or a virtual environment for games or other software applications and to enable a user interaction with the graphic image or virtual environment visible on interactive display surface 64, by identifying objects (or characteristics thereof) that are resting atop the display surface, such as an object 76a, or that are hovering just above it, such as an object 76b. It should be understood that objects 76a and 76b are illustrative rather than limiting, and represent any object proximate to display surface 64 that will reflect IR light, including portions of a user. Furthermore, these objects may also be detected using an entirely different approach, so that a signal responsive to the detection of such objects can be employed for determining biometric data for the object, as discussed herein.

Again referring to FIG. 2, interactive display table 60 can include a video projector 70 that is used to display graphic images, a virtual environment, or text information on interactive display surface 64. The video projector can be a liquid crystal display (LCD) or digital light processor (DLP) type, or a liquid crystal on silicon (LCoS) display type, with a resolution of at least 640×480 pixels, for example. An IR cut filter 86b can be mounted in front of the projector lens of video projector 70 to prevent IR light emitted by the video projector from entering the interior of the interactive display table housing where the IR light might interfere with the IR light reflected from object(s) on or above interactive display surface 64. Video projector 70 projects light along dotted path 82a toward a first mirror assembly 72a. First mirror assembly 72a reflects projected light from dotted path 82a received from video projector 70 along dotted path 82b through a transparent opening 90a in frame 62, so that the reflected projected light is incident on a second mirror assembly 72b. Second mirror assembly 72b reflects light from dotted path 82b along dotted path 82c onto translucent layer 64a, which is at the focal point of the projector lens, so that the projected image is visible and in focus on interactive display surface 64 for viewing.

Alignment devices 74a and 74b are provided and include threaded rods and rotatable adjustment nuts 74c for adjusting the angles of the first and second mirror assemblies to ensure that the image projected onto the display surface is aligned with the display surface. In addition to directing the projected image in a desired direction, the use of these two mirror assemblies provides a longer path between projector 70 and translucent layer 64a to enable a longer focal length (and lower cost) projector lens to be used with the projector. In some alternate implementations, an LCD panel or an organic light emitting diode (OLED) panel can be employed instead of a video projector for producing images on the interactive display surface. In one alternative implementation, a different type of user input detection system can be employed, such as a planar capacitive detector. In another such implementation, an area light detector can be employed that is integrated with a flat panel display. These and other alternatives will be recognized by the skilled practitioner as providing a substantially similar functionality relative to the above described embodiments, although different in technological implementation.

The foregoing and following discussions describe an interactive display device in the form of interactive display table 60 and 60'. Nevertheless, it is understood that the interactive display surface need not be in the form of a generally horizontal table top. The principles described in this description suitably also include and apply to display surfaces of different shapes and curvatures and that are mounted in orientations other than horizontal. Thus, although the following description refers to placing physical objects "on" the interactive display surface, physical objects may be placed adjacent to the interactive display surface by placing the physical objects in contact with the display surface, or otherwise adjacent to the display surface.

Logical Steps

In the discussion that follows, the illustrated methods can be implemented in some embodiments with components, devices, and techniques as discussed with reference to FIGS. 1-3. In some applications, one or more steps of the exemplary methods are embodied on a computer readable medium that stores computer readable code so that a series of steps are implemented when the computer readable code is executed on a computing device, such as a microprocessor of PC 20. In the following description, various steps of methods 400 and 500 are described with respect to a processor of a computing device that can perform certain method steps. In some implementations, certain steps of methods 400 and 500 can be combined, and performed simultaneously or in a different order, without deviating from the objective of the methods or without producing different results. In the description that follows, the term "user" includes both human and non-human biological entities. Thus, for example, the following methods can be readily employed to determine biometric data for pets and other animals, as well as for human users.

Figure 4:
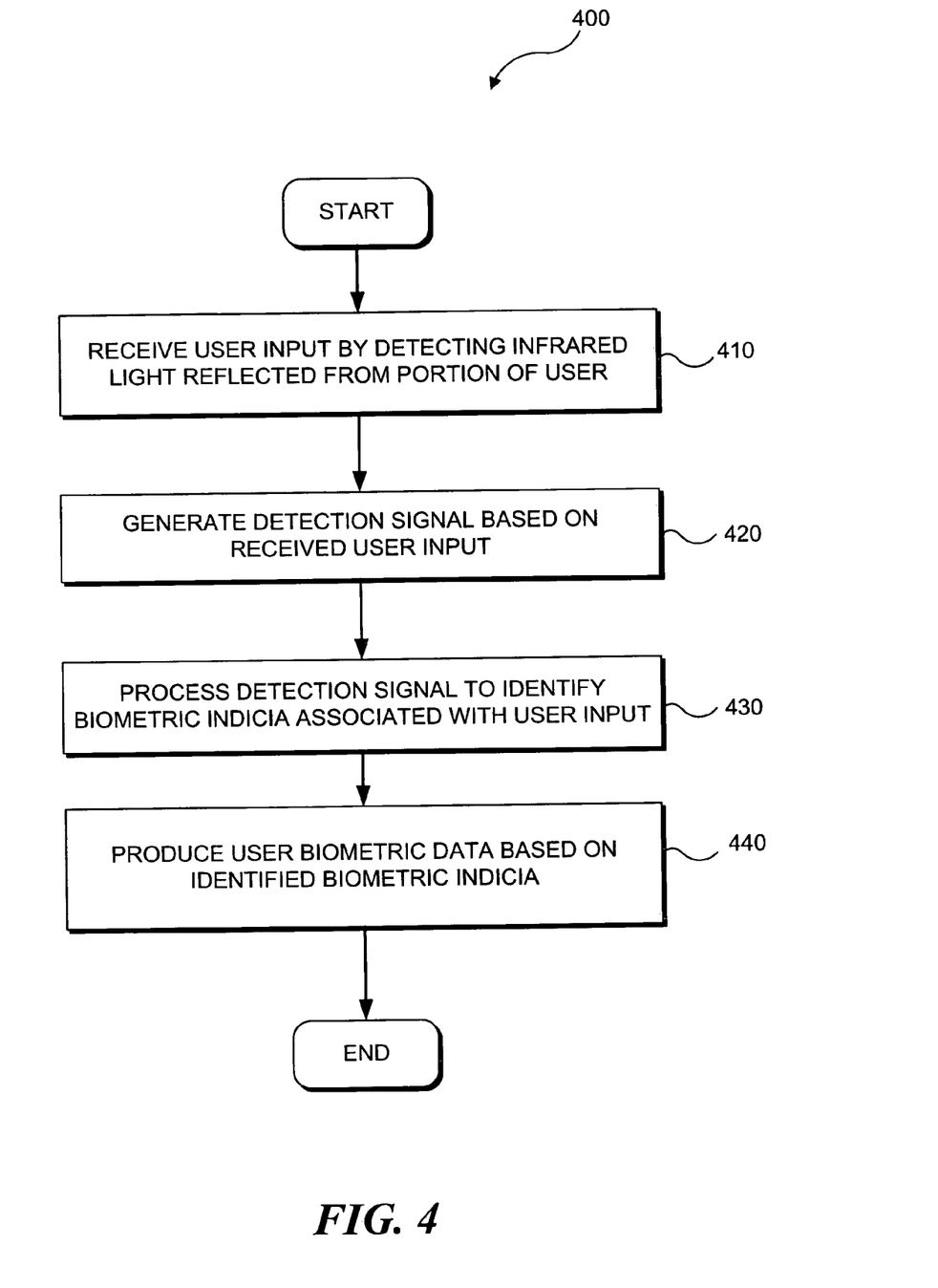
FIG. 4 is a flow diagram illustrating the steps of an exemplary method for producing user biometric data based on user input to an interactive display system, such as illustrated in FIGS. 1-3.

FIG. 4 is a flow diagram illustrating the steps of exemplary method 400 for producing user biometric data, based on user input to an interactive display. Generally, as discussed above, the interactive display can be configured for transmitting infrared light through a first side of the interactive display surface and then receiving a portion of the emitted infrared light that is reflected back through the interactive display surface from an object such as a hand of the user, that is disposed on or proximate to a second side of the interactive display surface, as described with references to FIGS. 1-3.

Method 400 begins at a step 410, when user input is received by the interactive display. The user input can be provided by the user positioning a portion of the user's body so that infrared light is reflected from the portion of the user and detected by the interactive display. User input can be received at any time that a detection system of an interactive display table is enabled for detecting infrared light reflected from objects that are proximate to the interactive display surface. While the user input will likely most often be provided with a user's hand or portions thereof, in some cases, the user input can alternatively be provided by a foot, a portion of a user's face, or another physical part of the user that is positioned on or sufficiently close to the interactive display surface to reflect infrared light back into the interactive display for detection by the video camera or other suitable detector.

In a step 420, a detection signal is generated, e.g., by video camera 68 (FIG. 2), based on the received user input. The detection signal can be generated anytime after user input is provided when a detection system of the interactive display is enabled. In some implementations, the detection signal can be an image representation of light reflected from the portion of the user. In an example, an image map of infrared intensity can be produced corresponding to the infrared light reflected back through the interactive display surface from the portion of the user that is proximate to the second side of the interactive display surface, such as when a user places a hand directly upon the interactive display surface. In another implementation, an image map of infrared intensity can be further processed to produce three-dimensional image information associated with the portion of the user reflecting the infrared light. Image processing techniques suitable for producing a pseudo three-dimensional mapping based on varying intensity will be known to the skilled practitioner, and therefore will not be further discussed. However, it should be noted that such a mapping has particular utility in estimating physical dimensions of a user's hands, feet, and face.

In a step 430, the detection signal is processed to identify biometric indicia associated with the user input. In certain implementations, the biometric indicia identify one or more physical characteristics of a portion of a user, for example, the user's hands, fingers, face and feet. The foregoing list is not intended to be exhaustive, but rather illustrative of the several forms of user biometric data that are expected to have particular utility for implementation with an interactive display. In one implementation, the detection signal is analyzed with an object recognition algorithm in order to identify one or more biometric indicia and produce a biometric recognition signal in response to each identified indicia. In another implementation, the detection signal can be conditioned to specifically prepare the signal for processing with the object recognition algorithm. In this implementation, the signal, which may represent an image, can be subjected to filtering and other digital image processing techniques that enhance imaging of certain physical characteristics of the portion of the user captured in the image. One example of such a processing technique includes applying an optical Fourier transform to the signal produced by detecting the reflected infrared light.

In another implementation, the biometric indicia can include a predetermined set of biometric measurements that can be used to model the detected portion of a user. For example, a biometric recognition signal can be generated that corresponds to a distal or proximal measurement from a geometrically determined position, such as the base of a hand to another portion of the hand, such as the tip(s) of one or more phalanges, where these parts of the hand are identified by an object recognition algorithm or other suitable technique. In this manner, an estimation of the distance between the geometrically determined position and a tip of one or more phalanges can be determined, providing biometric data corresponding to the user input. These types of estimations of physical properties enable the biometric data to be associated with a user profile for the user.

Furthermore, these biometric data distinguish the user from another user of the interactive display system. Once a user has been identified by providing user input employed by the interactive display system to produce the biometric data, the biometric data can be employed to access the user profile for that user.

In a step 440, the user biometric data are thus produced based on the biometric indicia identified in step 430, as discussed above. The user biometric data can include one or more parameters describing various physical characteristics associated with the portion of the user that reflected the infrared light. For example, the biometric data can include a parameterized representation of a portion of the user's hand, face, or foot, with each parameter identifying a specific measurement or estimation of a physical characteristic that is usable to uniquely identify the portion of the user. Many biometric identification techniques will be known to the skilled practitioner, and therefore need not be discussed herein in detail.

In one implementation, the biometric recognition signal is analyzed to first select one of a plurality of predetermined biometric archetypes templates. In this implementation, the biometric archetype templates are each associated with a specific portion of a user and define a set of biometric parameters for describing one or more physical characteristics of that specific portion. For example, a hand archetype template can include parameters for measurements for one or more of the phalanges, e.g., distances from tip to tip of each phalange, or distances from the tip of one or more phalanges to the base of the palm, proximal and distal measurements of the palm, and other measurements determined to be biometrically relevant. Similarly, a biometric archetype for a foot and a face will each have unique parameters that are quite distinct from the parameters for the hand archetype. Thus, each biometric archetype template describes a specific set of predetermined parameters for measurement and can also include mathematical models and predetermined ratios related to specific part of a user's body that tend to differ from one individual to another. The predetermined biometric archetype template can be selected based upon an initial set of estimations and can be compared to selected parameters of each archetype. Since the expected biometric parameters for a hand will be significantly different from those of a foot or a face, the archetype of each can be readily automatically selected by the software on the interactive display system based on a comparison of a few simple estimations produced using the image signal.

In another implementation, once the biometric archetype has been selected, at least one biometric parameter is determined from the user input. In one example, a subset of parameters for each archetype can be designated as essential parameters, with the remaining parameters designated as nonessential. In this example, essential parameters can be measured or estimated to populate the template, while nonessential parameters can be populated with default values.

In yet another implementation, a user biometric archetype can be generated that includes the determined biometric parameters. In this implementation, a specific user's measured or estimated parameters are employed to populate an instance of a biometric archetype. The instance can then be saved or used for interfacing with other currently running processes. In another embodiment, the biometric data can be associated with a particular user profile. In one example, the biometric data can be the instance of the biometric archetype populated with a specific user's measured or estimated parameters. In this manner, biometric parameters determined for a specific portion of a user, as determined from user input, can be specifically associated with a particular user account or user profile associated with the interactive display system. In some implementations, the user account can be related to logging on to the interactive display system. In other implementations, the user biometric data can be associated with a process hosted by a service at a remote location, for example an online application. Generally, a user profile or user account associates and stores certain personal preferences that a user has previously selected. These preferences can include desktop configuration preferences, access permissions and other security settings, shopping cart information including address and payment data, transaction history information and biometric data such as a user biometric archetype.

Figure 5:
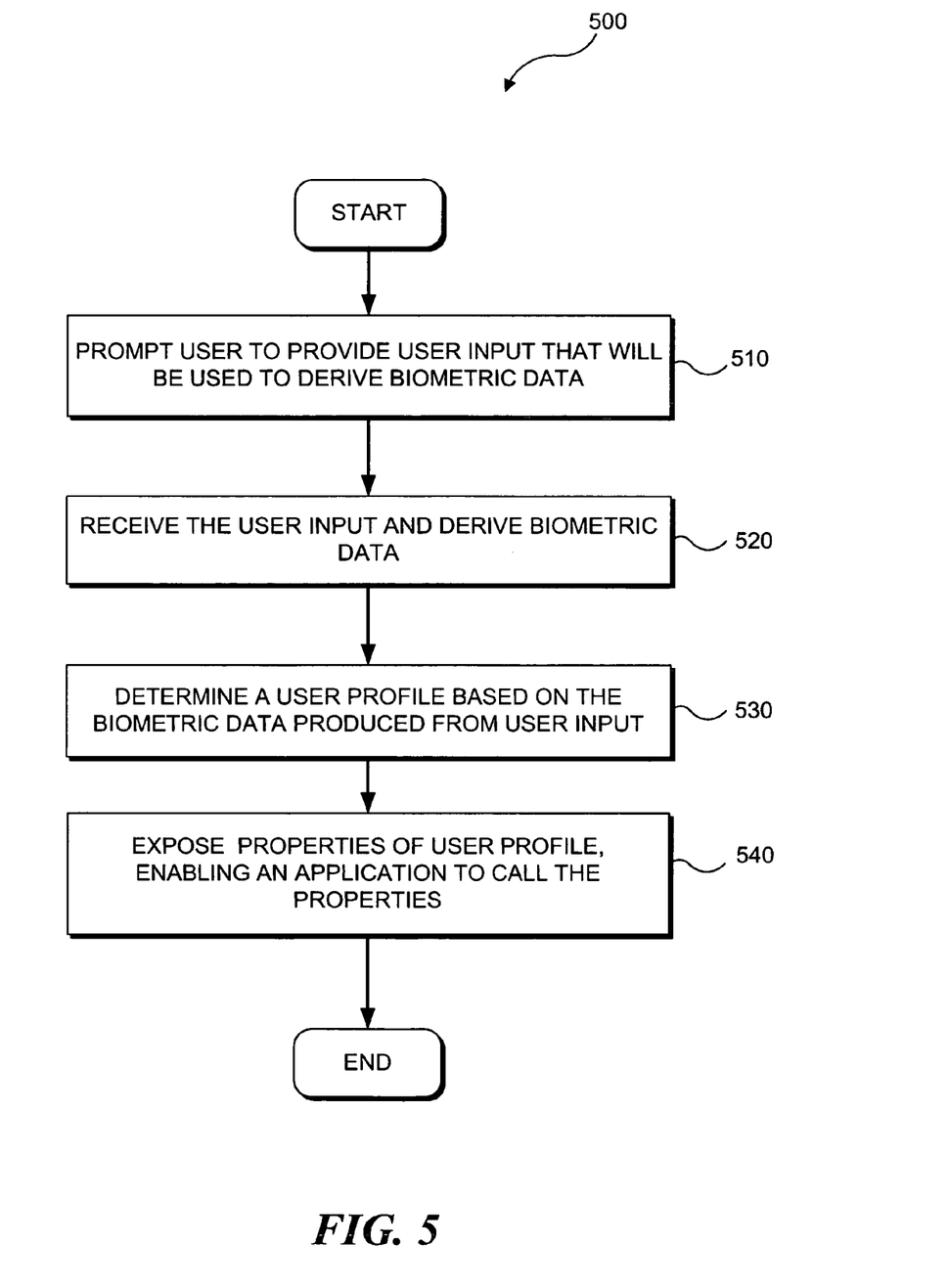
FIG. 5 is a flow diagram illustrating the steps of an exemplary method for enabling use of user biometric information in connection with an interactive display system, such as illustrated in FIGS. 1-3.

Turning now to FIG. 5, a flow diagram illustrating the steps of an exemplary method for enabling use of user biometric information with an interactive display is illustrated. Method 500 begins at a step 510, when a user is prompted to provide biometric input. The user can be prompted to provide the biometric input at any time that the interactive display is enabled to generate and display images, such as a prompt message. In one implementation, the user can be prompted to place a hand on or near a surface of the interactive display so that a biometric measurement of the hand can be performed. In another implementation, the user can be prompted to place a foot on or near the surface of the interactive display. In yet another implementation, the user can be prompted to position their face on or near the display surface of the interactive display, so that a biometric measurement of the face can be performed.

In a step 520, the biometric input is received. The biometric input can be received at any time that an interactive display is enabled for receiving the input. In some implementations, the receiving of the biometric input can be based on infrared light that is transmitted through a first side of the interactive display surface such that a portion of the infrared light is reflected back through the interactive display surface from an object such as a hand, that is proximate to a second side of the interactive display surface, as described with references to FIGS. 1-3.

In a step 530, biometric data is determined for the user form from the biometric input. In some implementations, the biometric data can be determined at any time after the user input is received. In some implementations, a user profile can be determined by comparing the biometric data derived from the user input to stored user biometric data associated with a set of stored user profiles. In this implementation, the user profile can be determined by identifying when a predetermined number of properties of the stored user biometric data match or otherwise correspond to the biometric data derived from the received user input. In this manner, a user authentication can be provided for a user account when the predetermined properties match the user biometric data associated with a specific user account. In one example, a user can place a hand on the surface of the interactive display, which can be received as user input, and the biometric data derived from the user input can be compared to biometric data stored in the memory of the interactive display for one or more users having access rights to the interactive display system. When a certain number of predetermined properties in the biometric data for the user input match those of a specific one of the stored biometric data, the user is associated with the matching stored biometric data and is authenticated so that access can be granted to that user's interactive table account.

In another implementation, the user's biometric data can be determined by invoking a biometric data control that is configured for communicating with a user input detection system and for processing the user input. In this implementation, an object recognition analysis can then be performed on the user input to identify at least one biometric parameter and a biometric profile template can be populated with biometric data derived from the object recognition analysis.

In a step 540, one or more properties of the determined biometric data are exposed, enabling an application to access or call the properties. The properties can be exposed at any time that a biometric data control is active, and configured to expose the user properties to a calling application. In yet another implementation, an application programming interface (API) can be configured to facilitate exposing the biometric data properties. In this implementation, the API can issue a get_properties call having a plurality of call parameters, comprising one or more user properties included in the biometric data for the user. The call can originate from an application, for example, an authentication routine. The get_properties call can then be received by a biometric data control process and parsed to retrieve the plurality of called parameters. Finally, a user profile can be returned to the biometric data control process in response to the get_properties call, thus enabling the properties of the user profile to be exposed to and accessed by the calling application.

Another implementation can include further steps such as associating the biometric data with a specific user account. In this implementation, in the event that biometric data are received, but do not match a user biometric data, a new user profile can be associated with the biometric data and with a new user account—assuming that authorization for creating such a new user profile has been granted the new user. In another implementation, an existing user profile and biometric data can be associated with another user account. In some implementations, more than one user biometric data set can be associated with a specific user account. In still another implementation, the associated biometric data and/or user profile can be stored in memory in the interactive display, or alternatively at a remote location.

Figure 6:
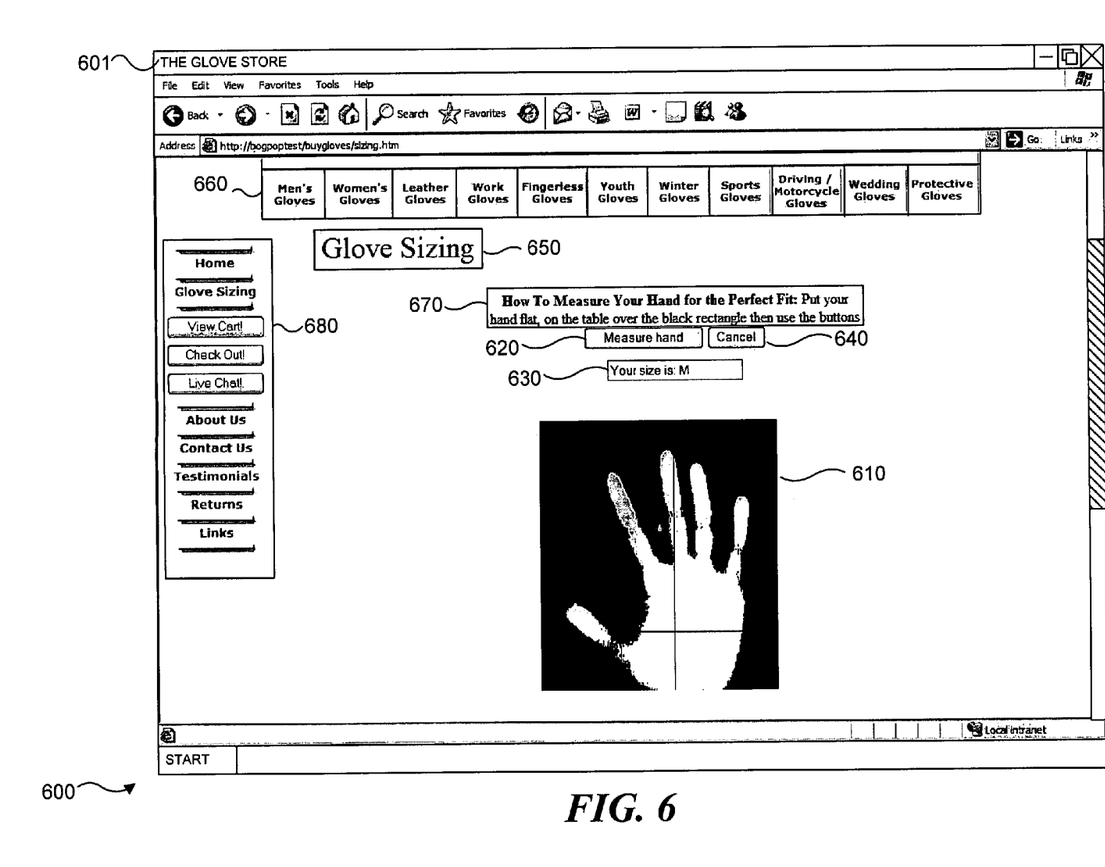
FIG. 6 is a schematic illustration of an exemplary web page 600 illustrating an application of the system and methods described in connection with FIGS. 1-5.

By way of illustrating an additional use of biometric data, FIG. 6 is a schematic illustration of an exemplary web page 600 illustrating an application of the interactive display system and methods illustrated by FIGS. 1-5. A title 601 of web page 600 reads "The Glove Store," indicating that web page 600 is used as a commercial shopping web site designed to sell gloves. A category navigation bar 660 provides navigation amongst category choices, such as men's gloves, women's gloves, leather gloves, work gloves, fingerless gloves, etc. Another navigation bar 680, provides navigation amongst choices, such as "View Cart", "Check Out", "Live Chat", etc. Web page 600 has a window title 650 that reads "Gloves Sizing," indicating that this web page is designed for assisting a user with selecting a proper glove size. The user is instructed with a prompt message 670 that reads "Put your hand flat on the table over the black rectangle then use the buttons." A black rectangular measurement field 610 is shown below the prompt message with an image of a user's hand within the field. Buttons labeled "Measure hand" 620, and "Cancel," 640 are positioned below the prompt message, for controlling the user input. A result window 630, provides a graphical indication field for the result of a hand measurement process that can be performed based on the user input provided when a user places a hand on measurement field 610.

Although the use of web page 600 will likely be apparent from the Figure, an exemplary transaction using the web page might proceed as follows. A user navigates to web page 600 using the input capabilities of the interactive display. Web page 600 is then displayed on the surface of the interactive display enabling the user to interact with the web page. Following the prompt instructions, the user places a right hand over the measurement field, while using a finger of the left hand to activate the "Measure hand" button. A biometric control module in the interactive display facilitates the transfer of the user input to an object recognition algorithm, and then transfers properties of a calculated biometric data measurement based on the user input back to the web page for display of the glove size for the user in the result window, where it is indicated that the user's glove size is "M" (or medium). As illustrated by the example in FIG. 6, various biometric data can be determined by user interaction with an interactive display. It should be understood that the system and methods discussed with references to this and the other Figures can be employed to facilitate many other web-based interactions including without limitation, for example, assisting a user with selecting a shoe, boot or ski binding size, and in the selection of eyeglasses and hats.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A computer implemented method for obtaining biometric data of a user and for using the biometric data to identify a size of an article of clothing that fits the user, wherein the biometric data is based on a user input to an interactive display that is able to simultaneously detect inputs at a plurality of locations proximate to a surface of the interactive display and which is employed for displaying images and detecting the user input, the method being performed by a computing system that includes the interactive display and comprising the following:

receiving a user input, the user input being provided by detecting the input from a portion of a user positioned proximate to the surface of the interactive display, wherein the user is a biological entity that is not limited to being a human;

generating a detection signal based on the user input received;

processing the detection signal to identify biometric indicia associated with the user input;

producing biometric data for the user based on the identified biometric indicia, the biometric data including at least one parameter describing one or more physical characteristics associated with the portion of the user that provided the user input; and identifying and displaying, at the interactive display, an attribute of an article of clothing that is sized to fit the user, based on the produced biometric data.

2. The method of claim 1, wherein the biometric indicia identifies at least one physical characteristic associated with at least one of:
(a) a hand;
(b) a finger;
(c) a face;
(d) a foot;
(e) a portion of a body of the user; or
(f) a paw.

3. The method of claim 1, wherein the interactive display is configured for transmitting non-visible light through a first side of the surface and receiving a portion of the non-visible light that is reflected back through the surface from objects that are proximate to a second side of the surface and wherein the step of generating a detection signal based on the user input received further comprises the step of producing an image map of non-visible light intensity that is based on the non-visible light reflected back through the interactive display surface from the portion of the user that is proximate to the second side of the interactive display surface.

4. The method of claim 3, wherein the image map of non-visible intensity is processed to produce three-dimensional image information associated with the portion of the user.

5. The method of claim 1, wherein the step of processing the detection signal comprises the step of analyzing the detection signal with an object recognition algorithm, the object recognition algorithm identifying one or more of the biometric indicia and producing corresponding biometric data in response to the biometric indicia identified.

6. The method of claim 1, further comprising the step of conditioning the detection signal to produce a conditioned detection signal that is specifically prepared for processing.

7. The method of claim 1, wherein the step of producing biometric data for the user comprises the steps of:
(a) analyzing the detection signal to select one of a plurality of predetermined biometric archetype templates, the biometric archetype templates each being associated with a specific different portion of a user and defining a set of biometric parameters for describing one or more physical characteristics of the specific different portion;
(b) determining at least one biometric parameter from the detection signal; and
(c) generating a user biometric archetype that includes the at least one biometric parameter that was determined, the user biometric archetype comprising the biometric data.

8. The method of claim 1, further comprising a step of associating the biometric data with a particular user profile.

9. The method of claim 1, wherein the biometric data comprises at least one of:
(a) a parameterized representation of at least a portion of a user's hand;
(b) a parameterized representation of at least a portion of a user's face;
(c) a parameterized representation of at least a portion of a user's foot;
(d) a parameterized representation of a portion of a user's body; or
(e) a parameterized representation of at least a portion of an animal.

10. The method of claim 1, further comprising the steps of:
(a) associating the user input, which comprises biometric input, with a specific user account; and
(b) storing the association of the biometric input with the specific user account.

11. The method of claim 10, further comprising the step of comparing properties of the biometric data determined from the biometric input received to corresponding properties of biometric data for at least one biometric input that is stored, and if a predetermined number of the properties match, enabling the user to access the specific user account associated with the biometric input that was stored and for which the predetermined number of properties were found to match.

12. The method of claim 1, wherein the method further includes a step of prompting a user to provide biometric input by at least one of:
(a) prompting the user to place a hand of the user proximate to a portion of the interactive display, for performing a hand measurement;
(b) prompting the user to place a foot of the user proximate to a portion of the interactive display, for performing a foot measurement;
(c) prompting the user to place a face of the user proximate to a portion of the interactive display, for performing a facial measurement; or
(d) prompting the user to place a portion of the user's body proximate to a portion of the interactive display.

13. The method of claim 10, wherein the method further includes:
(a) invoking a biometric data control, the biometric data control being configured for communicating with a user input detection system and for processing the biometric input;
(b) performing an object recognition analysis of the biometric input received, to identify at least one biometric parameter; and
(c) populating a biometric profile template with the at least one biometric parameter, the biometric profile template that is populated comprising the biometric data.

14. The method of claim 1, wherein the method further includes a step of exposing one or more properties of the biometric data by performing the steps of:
(a) enabling an application to issue a get_properties call requesting one or more user biometric properties included in the biometric data for the user;
(b) receiving the get_properties call;
(c) parsing the get_properties call to determine the one or more user biometric properties requested by the application; and
(d) returning to the application the one or more user biometric properties of the biometric data that were requested.

15. An interactive display system enabled for use in receiving a biometric user input, comprising:
(a) an interactive display surface on which graphic images are displayable, the interactive display surface comprising an upper surface and a lower surface;
(b) a sensor that is able to simultaneously detect a plurality of user inputs to the interactive display surface at a plurality of locations of the interactive display surface, the sensor producing a signal corresponding to an image of a portion of a user that is positioned proximate to the interactive display surface to provide a user input, wherein the user is a biological entity that is not limited to being a human; and (c) a computing system in communication with the sensor, the computing system including a processor, and a memory in communication with the processor, the memory storing machine instructions that cause the processor to carry out a plurality of interactive display functions, including:

processing the signal produced by the sensor to identify at least one biometric indicia associated with the user input;

producing biometric data based on the at least one biometric indicia, the biometric data including at least one parameter describing at least one physical characteristic associated with the portion of the user positioned to provide the user input; and identifying and displaying an attribute of an article of clothing that is sized to fit the user, based on the produced biometric data.

16. The interactive display system of claim 15, wherein the machine instructions further cause the processor to implement:

(a) an object recognition algorithm to identify one or more physical characteristics of the portion of a user positioned proximate to the upper surface of the interactive display surface; and (b) a biometric control module for enabling communication of biometric properties of the biometric data to an application.

17. The interactive display system of claim 16, wherein the sensor is configured for detecting non-visible light that is produced within the interactive display and caused to be reflected from an object disposed proximate to the interactive display surface, and wherein the sensor produces a bit mapped image of non-visible light reflected back through the interactive display surface from the portion of a user that is positioned proximate to the second side of the upper surface.

18. The interactive display system of claim 17, wherein the machine instructions cause the processor to process the bit mapped image to generate a substantially three-dimensional image of the portion of a user that is placed proximate to the upper surface.

19. The interactive display system of claim 16, wherein the object recognition algorithm is employed by the processor to identify one or more biometric parameters associated with the portion of a user that is positioned proximate to the upper surface.

20. The method of claim 1, wherein the method further includes:

displaying a measurement field on the interactive display surface where the user is prompted to place the portion of the user for which biometric data is to be obtained; and displaying an interactively selectable button on the interactive display surface which, when selected by receiving a touch input at the display surface, initiates the generating and processing of the detection signal and the production of the biometric data of the portion of the user that is positioned proximate the measurement field of the interactive display surface.

21. The method of claim 1, wherein the portion of the user comprises one of a hand, a foot, or a face and wherein the article of clothing comprises one of a shoe, a boot, a ski binding, eyeglasses, a glove or a hat.

22. The system of claim 15, wherein the machine instructions are further configured to cause the interactive display system to display a measurement field on the interactive display surface where the user is prompted to place the portion of the user for which biometric data is to be obtained, as well as an interactively selectable button on which, when selected by receiving a touch input, causes the sensor to produce the signal and to initiate the processing of the signal and the generation of the biometric data of the portion of the user that is positioned proximate the measurement field of the interactive display surface.

23. A computer readable storage media storing computer-executable instructions which, when executed by a processor of a computing system, implement the method recited in claim 1.

* * * * *

UNITED STATES PATENT AND TRADEMARK OFFICE
CERTIFICATE OF CORRECTION

| | |
|---|---|
| PATENT NO. | : 7,630,522 B2 |
| APPLICATION NO. | : 11/370558 |
| DATED | : December 8, 2009 |
| INVENTOR(S) | : Bogdan Popp et al. |

It is certified that error appears in the above-identified patent and that said Letters Patent is hereby corrected as shown below:

In column 18, line 31, in Claim 22, after "button" delete "on".

Signed and Sealed this
Twenty-fifth Day of January, 2011

David J. Kappos
*Director of the United States Patent and Trademark Office*